US011960876B2

(12) United States Patent
Hamasaki

(10) Patent No.: US 11,960,876 B2
(45) Date of Patent: Apr. 16, 2024

(54) CENTER, UPDATE MANAGEMENT METHOD, AND NON-TRANSITORY STORAGE MEDIUM

(71) Applicant: TOYOTA JIDOSHA KABUSHIKI KAISHA, Toyota (JP)

(72) Inventor: Jun Hamasaki, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 17/679,547

(22) Filed: Feb. 24, 2022

(65) Prior Publication Data

US 2022/0283799 A1    Sep. 8, 2022

(30) Foreign Application Priority Data

Mar. 5, 2021 (JP) ................................. 2021-035130

(51) Int. Cl.
*G06F 8/65*    (2018.01)
*G06F 8/61*    (2018.01)
*H04W 4/40*    (2018.01)

(52) U.S. Cl.
CPC .............. *G06F 8/65* (2013.01); *G06F 8/61* (2013.01); *H04W 4/40* (2018.02)

(58) Field of Classification Search
None
See application file for complete search history.

(56) References Cited

U.S. PATENT DOCUMENTS

| 2006/0218545 | A1* | 9/2006 | Taguchi | G06F 8/656 |
| | | | | 717/171 |
| 2015/0113520 | A1 | 4/2015 | Kotani et al. | |
| 2015/0178061 | A1* | 6/2015 | Wang | G06F 8/61 |
| | | | | 717/172 |
| 2019/0163466 | A1* | 5/2019 | Kiyama | H04W 4/44 |
| 2020/0042306 | A1* | 2/2020 | Kiyama | H04L 67/34 |
| 2021/0026617 | A1* | 1/2021 | Maru | G06F 8/65 |
| 2021/0157571 | A1 | 5/2021 | Ogawa et al. | |
| 2021/0173635 | A1* | 6/2021 | Shin | G01R 31/3647 |
| 2022/0035621 | A1* | 2/2022 | Nagano | G06F 8/10 |
| 2022/0066770 | A1* | 3/2022 | Jeong | G06F 8/65 |

FOREIGN PATENT DOCUMENTS

| JP | 2004-326689 A | 11/2004 |
| JP | 2015-079440 A | 4/2015 |
| JP | 2020-027652 A | 2/2020 |

* cited by examiner

*Primary Examiner* — Marina Lee
(74) *Attorney, Agent, or Firm* — Oliff PLC

(57) ABSTRACT

A center is configured to communicate with an OTA master configured to control software update of an electronic control unit installed in a vehicle. The center includes one or more processors configured to: receive a notification indicating progress of software update processing of the electronic control unit from the OTA master; manage an update status indicating an processing state of the software update processing in the vehicle based on the notification received by the one or more processors; and when the one or more processors receive a third notification following a first notification, set the update status based on the third notification, the third notification being different from a second notification scheduled to be received following the first notification.

4 Claims, 6 Drawing Sheets

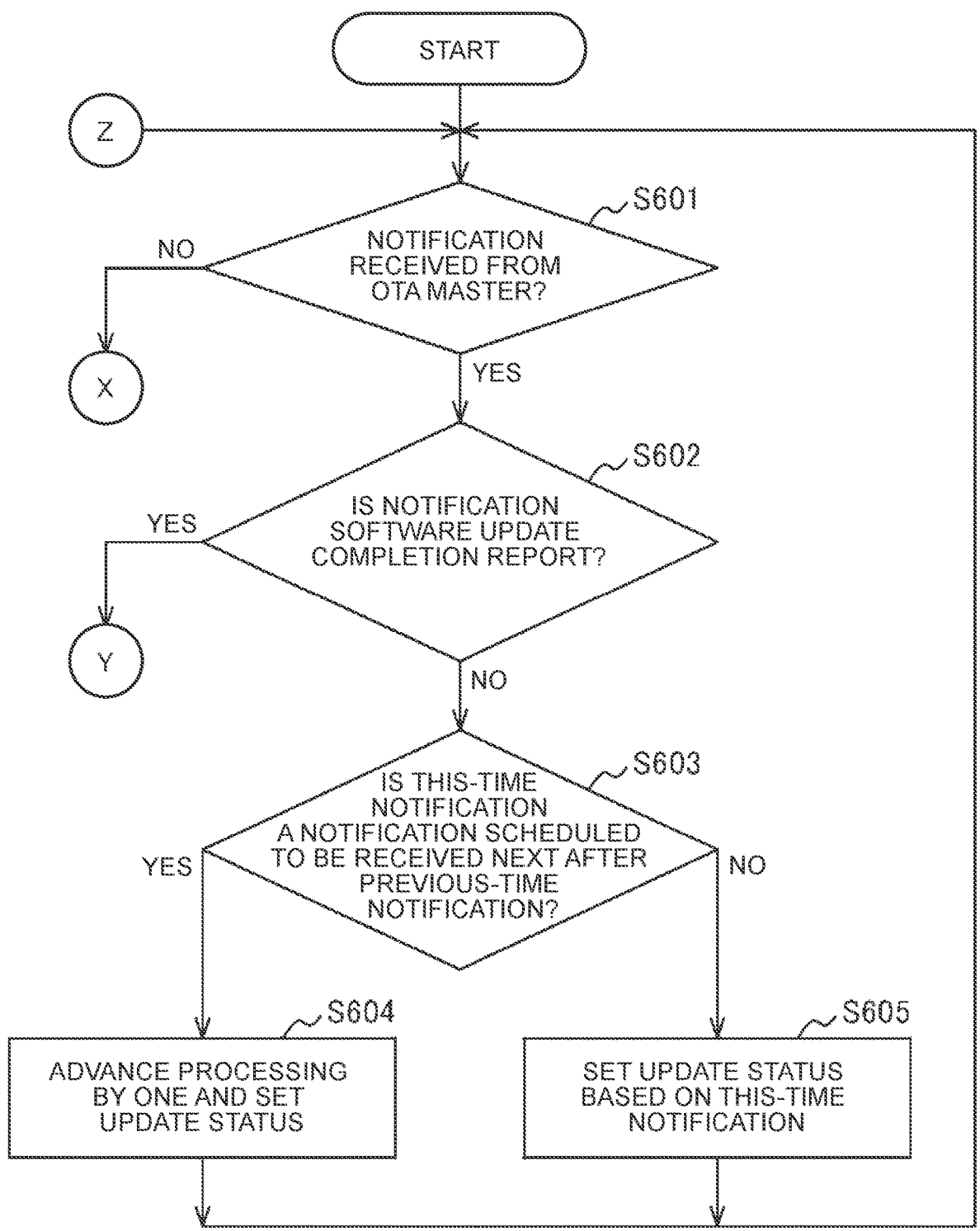

CENTER, UPDATE MANAGEMENT METHOD, AND NON-TRANSITORY STORAGE MEDIUM

CROSS-REFERENCE TO RELATED APPLICATION

This application claims priority to Japanese Patent Application No. 2021-035130 filed on Mar. 5, 2021, incorporated herein by reference in its entirety.

BACKGROUND

1. Technical Field

The present disclosure relates to a center, an update management method, and a non-transitory storage medium.

2. Description of Related Art

Vehicles have a plurality of electronic control units installed onboard, for controlling operations of the vehicle. An electronic control unit includes a processor, a temporary storage unit such as random-access memory (RAM), and nonvolatile memory that is a nonvolatile storage unit, such as flash read-only memory (ROM), the processor realizing control functions of the electronic control unit by executing software stored in the nonvolatile memory. The software stored in each electronic control unit is rewritable, and updating to a newer version of the software enables the functions of the electronic control units to be improved, new vehicle control functions to be added, and so forth.

Over-the-air (OTA) technology is known as a technology for updating software of electronic control units, in which in-vehicle communication equipment connected to an in-vehicle network, and a communication network such as the Internet or the like, are wirelessly connected, a device that handles update processing of the software of the vehicle downloads the software from a center having a server function, via wireless communication, and installing the downloaded software to the electronic control unit enables updating and addition of software of the electronic control unit to be performed. For example, see Japanese Unexamined Patent Application Publication No. 2004-326689 (JP 2004-326689 A).

In the software update processing using this OTA technology, the OTA master, which is the device that handles software update processing, notifies the center of information indicating the progress of the software update processing, at a predetermined timing (start, completion, etc.) so that the center can manage the status of the processing being executed in the vehicle.

SUMMARY

When the center cannot receive the notification indicating the progress of the software update processing transmitted from the OTA master for some reason, erroneous determination may be made at the center that an abnormality is occurring in the software update processing, even though the software update processing is proceeding normally in the vehicle. When such a determination is made, there is a possibility that there will be discrepancy between the update status managed by the vehicle and the update status managed by the center regarding the software update processing, which may affect the next software update processing.

The present disclosure provides a center, an update management method, and a non-transitory storage medium that can suppress erroneous determination that an abnormality has occurred in the software update processing when a notification indicating the progress of the software update processing transmitted from the OTA master is not successfully received.

A center according to a first aspect of the present disclosure is configured to communicate with an OTA master configured to control software update of an electronic control unit installed in a vehicle. The center includes: one or more processors configured to: receive a notification indicating progress of software update processing of the electronic control unit from the OTA master; manage an update status indicating an processing state of the software update processing in the vehicle based on the notification received by the one or more processors; and when the one or more processors receive a third notification following a first notification, set the update status based on the third notification, the third notification being different from a second notification scheduled to be received following the first notification.

An update management method according to a second aspect of the present disclosure is executed by a computer of a center including a processor and memory, and configured to communicate with an OTA master configured to control software update of an electronic control unit installed in a vehicle. The method includes: receiving a notification indicating progress of software update processing of the electronic control unit from the OTA master; and managing an update status indicating an processing state of the software update processing in the vehicle based on the notification, wherein managing of the update status includes, when receiving a third notification following a first notification, setting the update status based on the third notification, the third notification being different from a second notification scheduled to be received following the first notification.

A non-transitory storage medium according to a third aspect of the present disclosure stores an update management program that is executable by a computer of a center including a processor and memory, and configured to communicate with an OTA master configured to control software update of an electronic control unit installed in a vehicle and that causes the computer to perform functions including: receiving a notification indicating progress of software update processing of the electronic control unit from the OTA master; and managing an update status indicating an processing state of the software update processing in the vehicle based on the notification, wherein managing of the update status includes, when receiving a third notification following a first notification, setting the update status based on the third notification, the third notification being different from a second notification scheduled to be received following the first notification.

According to the center, the update management method, the non-transitory storage medium, and so forth, of the present disclosure, a situation of erroneously determining an abnormality to be occurring in the software update processing can be suppressed from being made when a notification, indicating the progress of the software update processing that is from the OTA master, is not successfully received.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 6A is a flowchart of update status management processing executed at the center;

DETAILED DESCRIPTION OF EMBODIMENTS

In software update processing, a center according to the present disclosure advances an update status one at a time in a predetermined order as long as notifications, indicating the progress of the software update processing, are being received from the OTA master in the correct order, and when the notifications indicating the progress of the software update processing are not received from the OTA master in the correct order, sets the update status based on the notification received from the OTA master most recently. As a result, erroneous determination that an abnormality has occurred in the software update processing can be suppressed. An embodiment of the present disclosure will be described below in detail with reference to the drawings.

EMBODIMENT

Configuration

Figure 1:
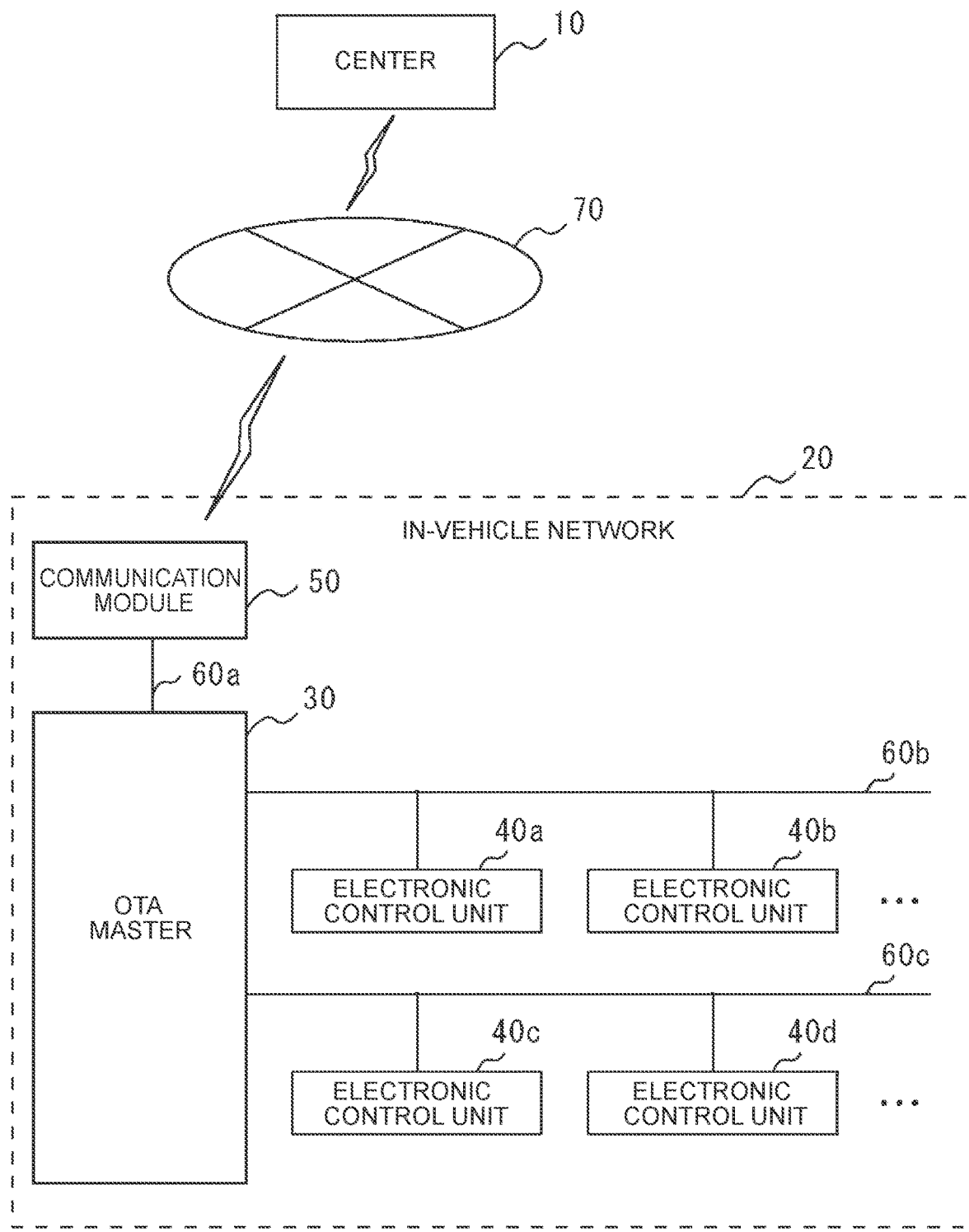
FIG. 1 is a block diagram illustrating an overall configuration of a network system including a center according to an embodiment.

FIG. 1 is a block diagram illustrating an overall configuration of a network system including a center according to an embodiment of the present disclosure. The network system illustrated in FIG. 1 is a system for updating software of a plurality of electronic control units 40a through 40d installed in a vehicle, and is provided with a center 10 that is outside of the vehicle, and an in-vehicle network 20 constructed inside of the vehicle.

1. Center

The center 10 is capable of communicating with a later-described OTA master 30 provided to the in-vehicle network 20, via a network 70, and is capable of managing software update of the electronic control units 40a through 40d that are connected to the OTA master 30, by performing communication such as transmission of update data of the electronic control units, reception of notifications indicating progress of software update processing, and so forth. The center 10 has functions of a so-called server.

Figure 2:
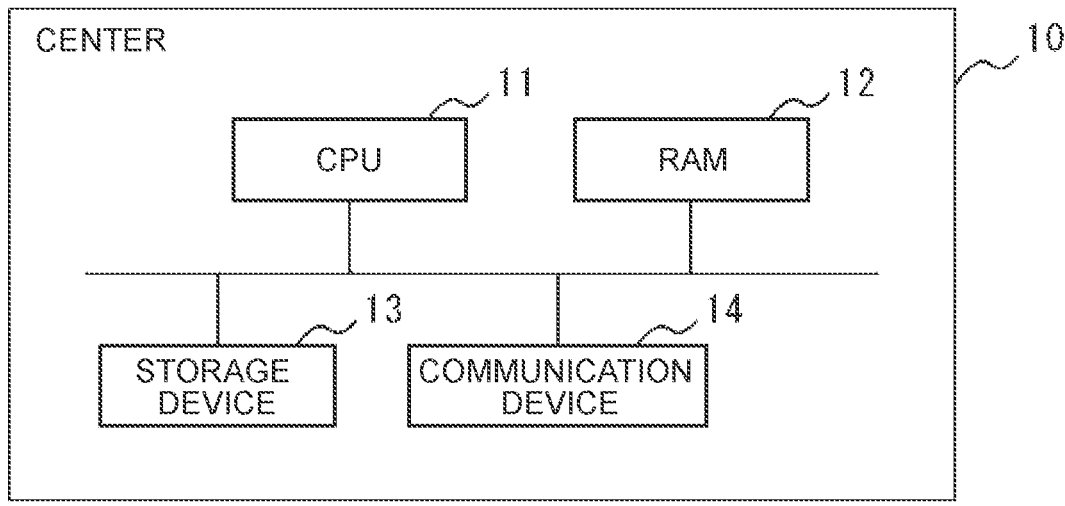
FIG. 2 is a block diagram illustrating a schematic configuration of the center.

FIG. 2 is a block diagram illustrating a schematic configuration of the center 10 in FIG. 1. As shown in FIG. 2, the center 10 includes a central processing unit (CPU) 11, random-access memory (RAM) 12, a storage device 13, and a communication device 14. The storage device 13 is a device including a readable/writable storage medium such as a hard disk drive (HDD) or a solid state drive (SSD), and stores programs for executing software update management, information used for software update management, update data of each electronic control unit, and so forth. At the center 10, the CPU 11 executes the program read from the storage device 13, using the RAM 12 as a work area, thereby executing predetermined processing relating to software update. The number of the CPUs 11 is not limited to one. The communication device 14 is a device for communicating with the OTA master 30 via the network 70.

Figure 3:
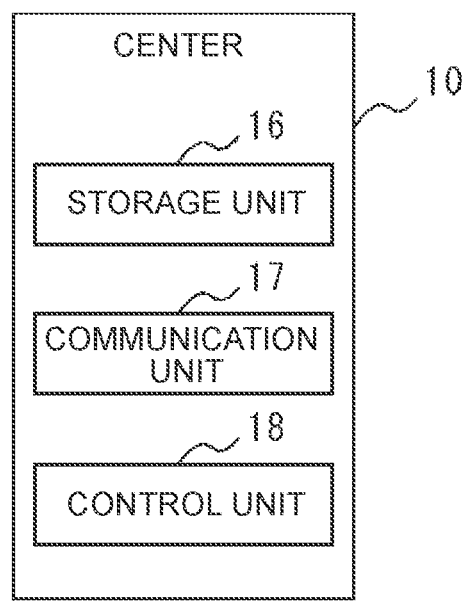
FIG. 3 is a functional block diagram of the center.

FIG. 3 is a functional block diagram of the center 10 illustrated in FIG. 2. The center 10 illustrated in FIG. 3 includes a storage unit 16, a communication unit 17, and a control unit 18. The storage unit 16 is realized by the storage device 13 illustrated in FIG. 2. The communication unit 17 and the control unit 18 are realized by the CPU 11 illustrated in FIG. 2 executing a program stored in the storage device 13 using the RAM 12.

The storage unit 16 stores information regarding software update processing of one or more electronic control units installed in the vehicle. The storage unit 16 stores update management information in which information, indicating software usable by the electronic control units, is associated with each vehicle identification information (vehicle ID) that identifies the vehicle, and software update data of the electronic control units, as information related to the software update processing. A combination of the latest version information of software of each of the electronic control units is defined as, for example, information indicating software usable by the electronic control units. Also, the storage unit 16 stores an update status indicating an update processing state of software being performed in the vehicle, as information relating to software update processing.

The communication unit 17 is capable of receiving software update confirmation requests from the OTA master 30. The update confirmation request is, for example, information transmitted from the OTA master 30 to the center 10 when the power or the ignition (IGN) is turned on in the vehicle, and is information for requesting the center 10 to confirm whether there is update data of the electronic control unit, based on later-described vehicle configuration information. Also, the communication unit 17 is capable of receiving transmission requests (download requests) for distribution packages from the OTA master 30. Upon receiving the download request for the distribution package, the communication unit 17 transmits the distribution package including the update data of the software of the electronic control unit, generated by the later-described control unit 18, to the OTA master 30.

When the communication unit 17 receives the update confirmation request from the OTA master 30, the control unit 18 determines whether there is software update data for the electronic control units installed in the vehicle identified by the vehicle ID included in the update confirmation request, based on the update management information stored in the storage unit 16. When determining that there is software update data for the electronic control unit, and receiving a download request for the distribution package from the OTA master 30, the control unit 18 generates a distribution package containing the corresponding update data stored in the storage unit 16.

2. In-Vehicle Network

The in-vehicle network 20 includes the OTA master 30, the electronic control units 40a through 40d, and a communication module 50. The OTA master 30 and the communication module 50 are connected via a bus 60a. The OTA master 30 and the electronic control units 40a and 40b are connected via a bus 60b. The OTA master 30 and the electronic control units 40c and 40d are connected via a bus 60c.

The OTA master 30 can wirelessly communicate with the center 10 via the network 70 via the bus 60a and the communication module 50. Also, the OTA master 30 can perform wired communication with the electronic control units 40*a* through 40*d* via the buses 60*b* and 60*c*. The OTA master 30 is a device having a function of managing the OTA state, controlling the software update sequence, and performing software update of the electronic control unit that is the object of updating (hereinafter referred to as "target electronic control unit"), and controls the software update of the target electronic control unit of the electronic control units 40*a* through 40*d*, based on the update data acquired from the center 10. The OTA master 30 may also be referred to as a "central gateway (CGW)".

Figure 4:
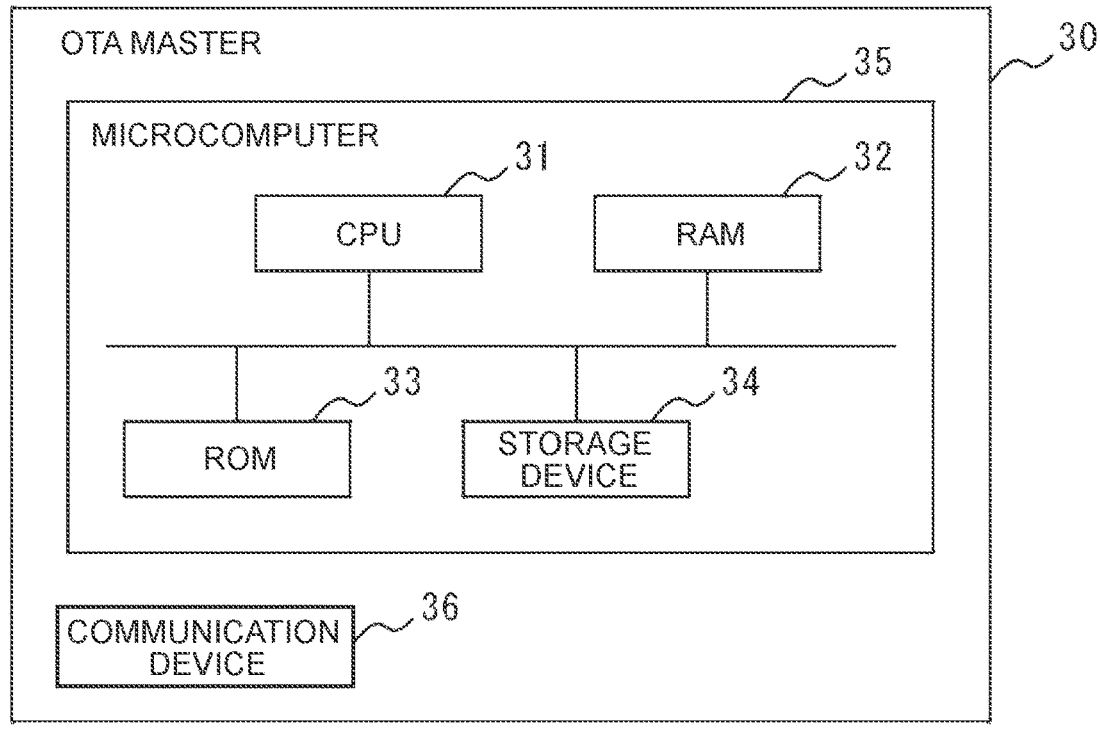
FIG. 4 is a block diagram illustrating a schematic configuration of an OTA master.

FIG. 4 is a block diagram illustrating a schematic configuration of the OTA master 30 in FIG. 1. As illustrated in FIG. 4, the OTA master 30 includes a CPU 31, RAM 32, read-only memory (ROM) 33, a storage device 34, and a communication device 36. The CPU 31, the RAM 32, the ROM 33, and the storage device 34 make up a microcomputer 35. In the OTA master 30, the CPU 31 executes programs read from the ROM 33, using the RAM 32 as a work area, thereby executing predetermined processing related to software update. The communication device 36 is a device for communicating with the communication module 50 and the electronic control units 40*a* through 40*d*, via the buses 60*a* through 60*c* illustrated in FIG. 1.

Figure 5:
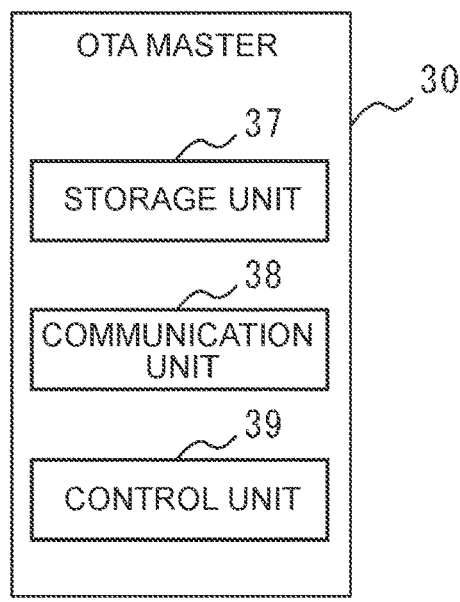
FIG. 5 is a functional block diagram of the OTA master.

FIG. 5 is a functional block diagram of the OTA master 30 illustrated in FIG. 4. The OTA master 30 illustrated in FIG. 5 includes a storage unit 37, a communication unit 38, and a control unit 39. The storage unit 37 is realized by the storage device 34 illustrated in FIG. 4. The communication unit 38 and the control unit 39 are realized by the CPU 31 illustrated in FIG. 4 executing a program stored in the ROM 33 using the RAM 32.

The storage unit 37 stores information (type information) regarding the type of the nonvolatile memory installed in each of the electronic control units 40*a* through 40*d*, and so forth. This type information may be generated in advance based on the specifications of the electronic control units 40*a* through 40*d* making up the in-vehicle network 20 and stored in the storage unit 37 at the time of manufacturing the vehicle, or may be acquired by the later-described communication unit 38 from the target electronic control unit by communication within the in-vehicle network 20 at the time of software update processing.

The communication unit 38 transmits a software update confirmation request to the center 10, with the power or ignition (IGN) of the vehicle being turned on, for example, as a trigger. Also, the communication unit 38 receives a notification indicating whether there is update data from the center 10, as a response to the update confirmation request. When there is update data of the software of the electronic control unit, the communication unit 38 transmits a download request for the distribution package to the center 10 and receives the distribution package transmitted from the center 10. Also, the communication unit 38 may acquire the type information of the nonvolatile memory from the target electronic control unit by communication at the time of software update processing.

The control unit 39 determines whether there is update data of the software of the electronic control unit, based on the response to the update confirmation request received by the communication unit 38. Also, the control unit 39 verifies the authenticity of the distribution package received from the center 10 by the communication unit 38 when there is software update data, and transfers one or more pieces of update data stored in the storage unit 37 by downloading to the target electronic control unit. Further, the control unit 39 causes the target electronic control unit to install the update data, and instructs the target electronic control unit to activate the installed update version of the software after the installation is completed.

The electronic control units 40*a* through 40*d* are devices (ECUs) for controlling operations of various parts of the vehicle. Although four electronic control units 40*a* through 40*d* are exemplified in FIG. 1, the number of electronic control units is not limited in particular. A display device (human-machine interface (HMI)) for performing various types of display, such as a display indicating that there is update data during the software update processing of the electronic control units 40*a* through 40*d*, displaying an acceptance request screen prompting a user or administrator of the vehicle to accept software update, displaying results of software update, and so forth, for example, may be connected to the OTA master 30. An automotive navigation system or the like can be used for the display device. Also, the number of buses connecting the electronic control unit to the OTA master 30 is not limited in particular. For example, the aforementioned display device may be connected to the OTA master 30 via a bus other than the buses 60*a* through 60*c*.

The communication module 50 is a unit having a function of controlling communication between the center 10 and the vehicle, and is communication equipment for connecting the in-vehicle network 20 to the center 10. The communication module 50 is wirelessly connected to the center 10 via the network 70, and the OTA master 30 performs vehicle authentication, update data downloading, and so forth via the communication module 50. Note that a configuration may be made in which the communication module 50 is included in the OTA master 30.

Overview of Software Update Processing

The OTA master 30 transmits a software update confirmation request to the center 10, with the power or ignition of the vehicle being turned on, for example, as a trigger. The update confirmation request includes the vehicle ID for identification of the vehicle, and vehicle configuration information that is information regarding the state (system configuration) of the electronic control units, such as the hardware and software versions of the electronic control units 40*a* through 40*d* connected to the in-vehicle network 20. Vehicle configuration information can be generated by acquiring the identification number of the electronic control units (ECU_ID) and the identification number of the software version of the electronic control units (ECU_Software_ID), from the electronic control units 40*a* through 40*d* connected to the in-vehicle network 20. The vehicle ID and the software versions for the electronic control units 40*a* through 40*d* are used to determine whether there is software update data for the electronic control units, by making comparison with the latest software version held by the center 10 for each vehicle ID. Further, the OTA master 30 receives a notification indicating whether there is update data from the center 10 as a response to the update confirmation request. When there is update data of the software of the electronic control unit, the OTA master 30 transmits a download request for the distribution package to the center 10, and receives the distribution package transmitted from the center 10. The distribution package may include, in addition to the update data, verification data for verifying the authenticity of the update data, the number of pieces of the update data, the order of installation, various types of control information to be used during software update, and so forth.

The OTA master 30 determines whether there is software update data for the electronic control units, based on the response from the center 10 to the received update confirmation request. Also, the OTA master 30 verifies the authenticity of the distribution package received from the center 10 and stored in the storage device 13. Further, the OTA master 30 transfers one or more pieces of update data downloaded in the distribution package to the target electronic control unit, and causes the target electronic control unit to install the update data. After installation is complete, the OTA master 30 instructs the target electronic control unit to activate the installed update version of the software.

In acceptance request processing, the OTA master 30 causes the output device to output a notification that acceptance is required for the software update, and a notification prompting input of accepting the software update. A display device that makes notification by display, an audio output device that makes notification by audio, or the like, can be used as the output device. For example, when the display device is used as an output device in the acceptance request processing, the OTA master 30 is capable of causing the display device to display an acceptance request screen for requesting acceptance of the software update, and to display a notification prompting a particular input operation, such as the user or the administrator pressing an acceptance button when accepting. Also, in the acceptance request processing, the OTA master 30 is capable of displaying on the display device text, icons, or the like, notifying that there is software update data for the electronic control units, displaying on the display device restrictions while the software update processing is being executed, and so forth. Upon accepting the input regrading acceptance from the user or the administrator, the OTA master 30 executes the above installation and activation control processing, and updates the software of the target electronic control unit.

The software update processing is made up of a phase in which the OTA master 30 downloads update data from the center 10 (download phase), a phase in which the OTA master 30 transfers the downloaded update data to the target electronic control unit and installs the update data in the storage region of the target electronic control unit (installation phase), and a phase in which the target electronic control unit activates the update version of the software that is installed (activation phase).

Downloading is processing in which the OTA master 30 receives the update data for updating the software for the electronic control unit transmitted from the center 10 in the form of a distribution package, and stores the update data in the storage device 34. The download phase includes not only execution of downloading, but also includes control of a series of processing relating to downloading, such as determining whether downloading can be executed, verification of the update data, and so forth.

The update data transmitted from the center 10 to the OTA master 30 may contain any of update software for the electronic control unit, compressed data in which update software has been compressed, and divided data in which update software or compressed data has been divided. Also, the update data may include an ECU_ID (or serial No.) of the target electronic control unit and an ECU_Software_ID of the electronic control unit before updating. The update data is downloaded as the aforementioned distribution package that contains update data for one or more electronic control units.

Installation is processing in which the OTA master 30 writes update software (an update version program) to the target electronic control unit, based on the update data downloaded from the center 10. The installation phase includes not only execution of installing, but also includes control of a series of processing relating to installing, such as determining whether installation can be executed, transfer of the update data, verification of the update software, and so forth.

When the update data includes the update software itself, the OTA master 30 transfers the update data (update software) to the target electronic control unit in the installation phase. Also, when the update data includes compressed data, difference data, or divided data of the update software, the OTA master 30 may transfer the update data to the target electronic control unit, and the target electronic control unit may generate the update software from the update data, or the update software may be transferred to the target electronic control unit after the OTA master 30 generates the update software from the update data. Now, the update software can be generated by decompressing compressed data or assembling difference data or divided data.

The update software can be installed by the target electronic control unit based on an installation request from the OTA master 30. Alternatively, the target electronic control unit that has received the update data may autonomously perform installation, without receiving an explicit instruction from the OTA master 30.

Activation is processing in which the target electronic control unit enables (activates) the installed update software. The activation phase includes not only execution of activating, but also includes a series of control relating to activating, such as determining whether activation can be executed, verification of execution results, and so forth.

Activation of the update software can be performed by the target electronic control unit, based on an activation request from the OTA master 30. Alternatively, the target electronic control unit, which has received the update data, may autonomously activate the update software following completion of installation, without receiving an explicit instruction from the OTA master 30.

Note that the software update processing can be performed successively or in parallel for each of the electronic control units.

Further, the "software update processing" in the present specification includes not only processing of successively performing all of the downloading, installation, and activation, but also processing of performing only a part of the downloading, installation, and activation.

Processing

Figure 6B:
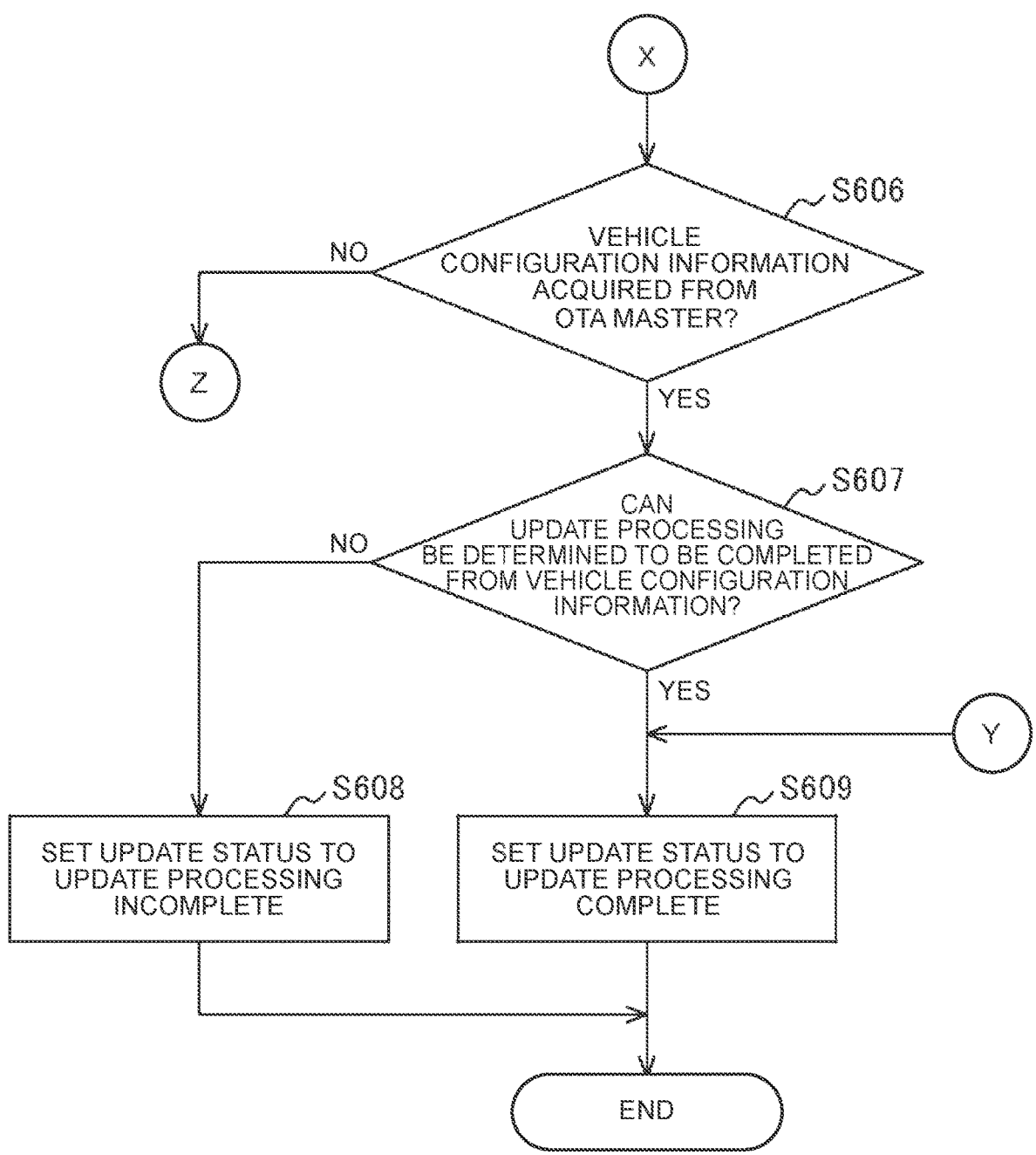
FIG. 6B is a flowchart of update status management processing executed at the center.

Next, the processing executed in the network system according to the present embodiment will be described further with reference to FIGS. 6A and 6B. FIGS. 6A and 6B are flowcharts showing the procedures of the update status management processing executed by the center 10. The processing of FIG. 6A and the processing of FIG. 6B are connected by connectors X, Y, and Z.

The update status management processing shown in FIGS. 6A and 6B is started when there is a campaign to update the software of the electronic control unit.

Step S601

The center 10 determines whether a notification has been received from the OTA master 30. Examples of notifications that the center 10 receives from the OTA master 30 when there is a campaign include (a) the acceptance results regarding a campaign, downloading, installation, and activation, based on user instructions, (b) confirmation prior to execution of each of downloading, installation, and activation, (c) report of start of downloading, installation, and activation, (d) report of processing of downloading, installation, and activation, (e) report of completion of downloading, installation, and activation, (f) report of software update completion, and so forth. Notifications are not limited to these, and part of these notifications may be omitted, and other notifications may be added. The reception of the notification determined in step S601 means the reception of the acceptance result of the campaign, which is the first notification, or the reception of a new notification after the update status is set based on a certain notification. When the center 10 receives a notification from the OTA master 30 (YES in step S601), the processing advances to step S602, and when the center 10 has not received a notification from the OTA master 30 (NO in step S601), the processing advances to step S606.

Step S602

The center 10 determines whether the notification received from the OTA master 30 is a "software update completion report". When a software update completion report is received, the center 10 determines that the software update processing has been completed successfully at the vehicle side. When the notification received from the OTA master 30 is a software update completion report (YES in step S602), the processing advances to step S609, and when the notification received from the OTA master 30 is not a software update completion report (NO in step S602), the processing advances to step S603.

Step S603

The center 10 determines whether a this-time notification that is the notification received this time (second notification or third notification) from the OTA master 30 is a notification scheduled to be received next after a previous-time notification that is a notification (first notification) received from the OTA master 30 the previous time. Whether the this-time notification is the notification scheduled to be received after the previous-time notification can be determined according to a predetermined processing sequence in the software update processing. As an example, the notification that is scheduled to be received after the notification of "download completion report" is determined to be the notification of "installation acceptance results". When the this-time notification from the OTA master 30 is the notification scheduled to be received next after the previous-time notification (when the this-time notification is the second notification) (YES in step S603), the processing advances to step S604, and when the this-time notification received from the OTA master 30 is not the notification scheduled to be received next to the previous-time notification (when the this-time notification is the third notification) (NO in step S603), the processing advances to step S605.

Step S604

The center 10 sets the update status managed thereby to the update status in which the processing is advanced by one. The order of progress of the update status can be set in advance. As an example, when the current update status is "preparing to start installation" and the notification of "installation start report" that is scheduled to be received next is successfully received, the update status is set to "installing", which is processing one advanced from this "preparing to start installation". When the update status is set, the processing advances to step S601.

Step S605

The center 10 sets the update status managed thereby to an update status based on the this-time notification received from the OTA master 30. That is to say, the center 10 deems all notifications from the previous-time notification to the this-time notification have been received, and sets (changes) the update status to the contents based on the this-time notification. As an example, when the current update status is "preparing to start installation", and a notification of "installation completion report", which is not scheduled to be received next is received, the update status is set to "installation complete" based on the this-time notification. When the update status is set, the processing advances to step S601.

Step S606

The center 10 determines whether vehicle configuration information has been acquired from the OTA master 30. The vehicle configuration information is acquired by a software update confirmation request transmitted from the OTA master 30, with the power or ignition of the vehicle being turned on as a trigger. When the vehicle configuration information is acquired from the OTA master 30 (YES in step S606), the processing advances to step S607, and when no vehicle configuration information is acquired from the OTA master 30 (NO in step S606), the processing advances to step S601.

Step S607

Based on the vehicle configuration information acquired from the OTA master 30, the center 10 determines whether the software update processing, for which the notification of a "software update completion report" has not been received from the OTA master 30, has been successfully completed. This determination is made based on whether the software version indicated by the target electronic control unit when the software update processing is successfully completed matches the software version of the target electronic control unit indicated in the vehicle configuration information. When determining that the software update processing has been successfully completed (YES in step S607), the processing advances to step S609, and when not determining that the software update processing has been successfully completed (NO in step S607), the processing advances to step S608.

Step S608

The center 10 sets the update status managed thereby to "update processing incomplete", indicating that the software update processing has not been completed. Upon the update status being set, the update status management processing ends.

Step S609

The center 10 sets the update status managed thereby to "update processing complete", indicating that the software update processing has been completed. Upon the update status being set, the update status management processing ends.

The center 10 may report the results regarding the OTA to original equipment manufacturer (OEM) that is a finished vehicle manufacturer, or the like, based on the update status of "update processing complete" and "update processing incomplete" set in the above steps S608 and S609.

Figure 7:
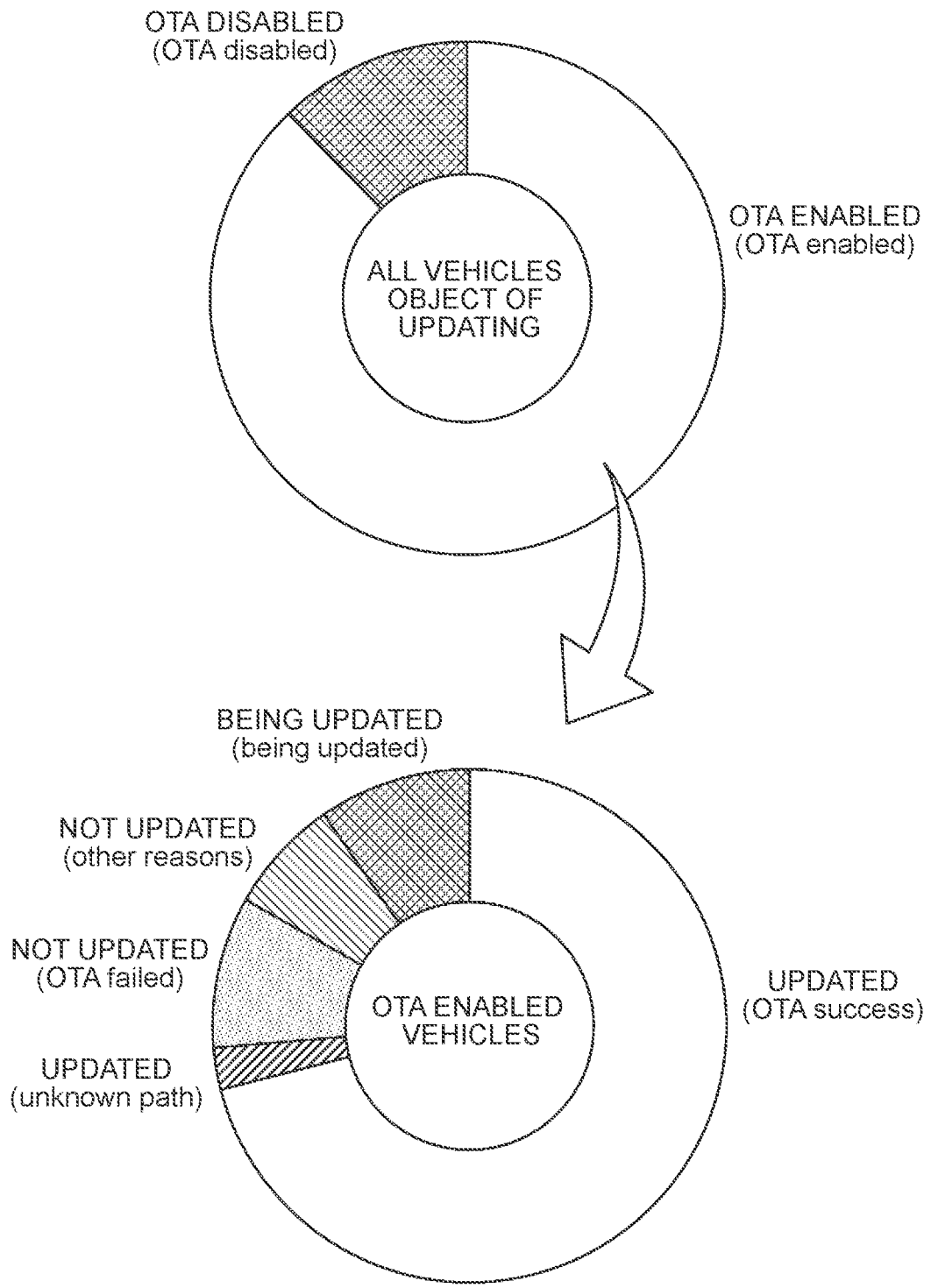
FIG. 7 is a diagram showing an example of results regarding OTA that the center reports to an OEM.

FIG. 7 shows an example of results (display screen) regarding OTA that the center 10 reports to the OEM. In the example in FIG. 7, the upper chart shows the proportion of vehicles regarding which OTA updating is permitted (OTA enabled) and vehicles regarding which OTA updating is not permitted (OTA disabled) out of all vehicles on the market that are the object of updating (all vehicles object of updating). The lower chart shows the implementation percentage of software update processing for vehicles that are permitted to update OTA (vehicles with OTA enabled). Vehicles of which the update status is "update processing complete" are included in "updated", and vehicles of which the update status is "update processing incomplete" are included in "not updated".

Operations and Effects

As described above, in software update processing, the center 10 according to an embodiment of the present disclosure advances the update status one at a time in a predetermined order as long as notifications of the update status are being received from the OTA master 30 in the correct order, and when the notifications of the update status are not received from the OTA master 30 in the correct order, sets the update status based on the notification received from the OTA master 30 most recently (this-time notification). Thus, the center 10 can be suppressed from making erroneous determination that an abnormality has occurred in the software update processing.

Further, when not receiving a software update completion report, which is a final notification, in the software update processing, the center 10 according to the present embodiment determines whether software update processing has successfully been completed, based on this vehicle configuration information at the timing of the vehicle configuration information being transmitted from the vehicle the next time. Thus, the center 10 can be suppressed from making erroneous determination that an abnormality has occurred in the software update processing.

Although an embodiment of the technology according to the present disclosure has been described above, the present disclosure can be understood as being, in addition to a center, an update management method executed by a center provided with a processor and memory, an update management program, a computer-readable non-transitory storage medium storing the update management program, and so forth.

The technology according to the present disclosure can be used in a network system for updating software of an electronic control unit.

What is claimed is:

1. A center that is configured to communicate with a control device, which is configured to control a software update of an electronic control unit installed in a vehicle, the center comprising:
one or more processors configured to:
wirelessly receive a notification indicating progress of software update processing of the electronic control unit from the control device,
wherein the control device is configured to:
wirelessly transmit, to the center, a download completion notification upon completion of downloading update software to which software of the electronic control unit is updated by the software update;
after transmitting the download completion notification, wirelessly transmit, to the center, a predetermined notification upon completion of a predetermined process, a combination of the predetermined process and the predetermined notification being at least one of:
i) a process of obtaining an acceptance of installation of the update software and an acceptance result of the installation;
ii) a process of the installation and an installation completion notification;
iii) a process of obtaining an acceptance of activation of the update software and an acceptance result of the activation; and
iv) a process of the activation and an activation completion notification; and
after transmitting the predetermined notification, wirelessly transmit, to the center, an update completion notification upon completion of the software update processing;
manage an update status indicating a processing state of the software update processing in the vehicle based on the notification indicating the progress of the software update processing and received by the one or more processors; and
even when the one or more processors receive the update completion notification following the download completion notification without receiving the predetermined notification, set the update status based on the update completion notification.

2. The center according to claim 1, wherein:
the one or more processors are configured to receive information indicating a state of the electronic control unit from the control device when neither the predetermined notification nor the update completion notification is received; and
the one or more processors are configured to determine whether the software update processing has been successfully completed, based on the information.

3. An update management method executed by a computer of a center including a processor and memory, and configured to communicate with a control device, which is configured to control a software update of an electronic control unit installed in a vehicle, the method comprising:
wirelessly receiving a notification indicating progress of software update processing of the electronic control unit from the control device,
wirelessly transmitting, to the center, a download completion notification upon completion of downloading update software to which software of the electronic control unit is updated by the software update;
after transmitting the download completion notification, wirelessly transmitting, to the center, a predetermined notification upon completion of a predetermined process, a combination of the predetermined process and the predetermined notification being at least one of:
i) a process of obtaining an acceptance of installation of the update software and an acceptance result of the installation;
ii) a process of the installation and an installation completion notification;
iii) a process of obtaining an acceptance of activation of the update software and an acceptance result of the activation; and
iv) a process of the activation and an activation completion notification; and
after transmitting the predetermined notification, wirelessly transmitting, to the center, an update completion notification upon completion of the software update processing; and
managing an update status indicating a processing state of the software update processing in the vehicle based on the notification indicating the progress of the software update processing,
wherein managing of the update status includes, even when receiving the update completion notification following the download completion notification without receiving the predetermined notification, setting the update status based on the update completion notification.

4. A non-transitory storage medium storing an update management program that is executable by a computer of a center including a processor and memory, and configured to communicate with a control device, which is configured to control a software update of an electronic control unit installed in a vehicle and that causes the computer to perform functions comprising:

wirelessly receiving a notification indicating progress of software update processing of the electronic control unit from the control device, wirelessly transmitting, to the center, a download completion notification upon completion of downloading update software to which software of the electronic control unit is updated by the software update;

after transmitting the download completion notification, wirelessly transmitting, to the center, a predetermined notification upon completion of a predetermined process, a combination of the predetermined process and the predetermined notification being at least one of:

i) a process of obtaining an acceptance of installation of the update software and an acceptance result of the installation;

ii) a process of the installation and an installation completion notification;

iii) a process of obtaining an acceptance of activation of the update software and an acceptance result of the activation; and iv) a process of the activation and an activation completion notification; and after transmitting the predetermined notification, wirelessly transmitting, to the center, an update completion notification upon completion of the software update processing; and managing an update status indicating a processing state of the software update processing in the vehicle based on the notification, wherein managing of the update status includes, even when receiving the update completion notification following the download completion notification without receiving the predetermined notification, setting the update status based on the update completion notification.

* * * * *